United States Patent
Ramanujam et al.

(10) Patent No.: US 10,887,116 B2
(45) Date of Patent: Jan. 5, 2021

(54) ETHERNET POWER DISTRIBUTION

(71) Applicant: Cisco Technology, Inc., San Jose, CA (US)

(72) Inventors: Padmanabhan Ramanujam, Bangalore (IN); Ahmed Faraz, Saharanpur (IN)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 15/836,972

(22) Filed: Dec. 11, 2017

(65) Prior Publication Data

US 2019/0182056 A1 Jun. 13, 2019

(51) Int. Cl.
*G06F 1/32* (2019.01)
*H04L 12/10* (2006.01)

(52) U.S. Cl.
CPC .............. *H04L 12/10* (2013.01); *G06F 1/32* (2013.01)

(58) Field of Classification Search
CPC ..... G06F 1/32; G06F 1/28; G06F 1/26; G06F 9/44
See application file for complete search history.

(56) References Cited

U.S. PATENT DOCUMENTS

| | | | |
|---|---|---|---|
| 7,392,407 B2 | 6/2008 | Jonnala et al. | |
| 7,693,076 B2 | 4/2010 | Karam | |
| 8,078,889 B2 | 12/2011 | Jonnala et al. | |
| 8,266,463 B2 | 9/2012 | Jonnala et al. | |
| 8,310,089 B2 | 11/2012 | Schindler et al. | |
| 8,375,232 B2 | 2/2013 | Khan et al. | |
| 9,531,551 B2 | 12/2016 | Balasubramanian et al. | |
| 2005/0085212 A1* | 4/2005 | Peker | H04L 12/10 455/402 |
| 2006/0263925 A1* | 11/2006 | Chandler | G01N 15/1227 438/61 |
| 2009/0003587 A1* | 1/2009 | Smith | H04B 3/02 379/413 |
| 2009/0164805 A1* | 6/2009 | Diab | G06F 1/26 713/300 |
| 2015/0372826 A1* | 12/2015 | Blaut | H04L 12/10 307/1 |
| 2016/0095189 A1* | 3/2016 | Vangeel | G06F 8/654 315/152 |

(Continued)

FOREIGN PATENT DOCUMENTS

| CN | 105897432 | 8/2016 |
|---|---|---|
| WO | 2016185257 | 11/2016 |

OTHER PUBLICATIONS

Cisco Universal Power Over Ethernet: Unleash the Power of your Network; White Paper 2014.

(Continued)

*Primary Examiner* — Keshab R Pandey
(74) *Attorney, Agent, or Firm* — Behmke Innovation Group LLC; James M. Behmke; Jonathon P. Western

(57) ABSTRACT

In one embodiment, a power sourcing equipment (PSE) includes: processing circuitry, a multiplicity of power over Ethernet (PoE) enabled ports, a PSE module to be executed by the processing circuitry and operative to: receive requests for power from at least two devices via one PoE enabled port from among the multiplicity of PoE enabled ports, allocate power for the at least two devices according to the requests for power, and provide the power to the at least two devices via the one PoE enabled port.

13 Claims, 4 Drawing Sheets

(56) References Cited

U.S. PATENT DOCUMENTS

2016/0164688 A1* 6/2016 Yseboodt ........... H05B 37/0254
307/1
2016/0191256 A1* 6/2016 Wendt .................... H04L 12/10
713/300

OTHER PUBLICATIONS

Babar, Sharmila B., et; "POE Based Sensor Network and its Power Management"; International Journal Recent Trends in Engineering and Research, vol. 3 issue 8, Aug. 2017.
Eaton, "Distributed Low Voltage Power System"; viewed on Aug. 22, 2017; available on the web at: http://www.cooperindustries.com/content/public/en/lighting/connected_s . . . .
Eisen, Morty; Marcum Technology; Introduction to PoE and the IEEE802.3af and 802.3at Standards 2009.
Microchip Technology, Inc; USB5826 : 6-Port USB 3.1 Gen 1Smart Hub with Support for Dual USB Type-C tm DFPs: 2016-2017; available on the web at: http://ww1.microchip.com/downloads/en/DeviceDoc/00002239B.pdf
Planet; POE 152S IEEE802.3af Power over Ethernet Splitter, viewed on Aug. 22, 2017, available on the web at http://www.planet.com.tw/en/product/product.php?id=30135.
POEINJECTOR.com; Power over Ethernet Hubs, viewed on Aug. 22, 2017.
TP-Link.com; PoE Splitter viewed on Aug. 22, 2017: available on the web at: http://www.tp-link.com/us/products/details/cat-43_TL-POE10R/html.
TRENDnet, TPE-104S Power over Ethernet (PoE) Splitter; viewed on Aug. 22, 2017; available on the web at: http://www.trendnet.com/products/proddetail?prod=140_TPE-104S.

* cited by examiner

ETHERNET POWER DISTRIBUTION

TECHNICAL FIELD

The present disclosure generally relates to distribution of power over Ethernet (PoE) from one POE port to multiple devices.

BACKGROUND

Systems and methods for passing electric power together with data on twisted pair Ethernet cabling are commonly referred to as Power over Ethernet (PoE). In a typical category 5 cable, there are four twisted pairs of wire; PoE uses one or two of the twisted pairs to provide power to connected devices. PoE therefore facilitates the use of a single cable to provide both data connection and electric power to devices such as wireless access points, IP cameras, VoIP phones, light emitting diode (LED) lights, Internet of Things (IoT) devices, etc.

The IEEE (Institute of Electrical and Electronics Engineers) 802.3 standard provides for signaling between the power sourcing equipment (PSE) and powered device (PD). This signaling facilitates the detection of a connected PD by the PoE, and serves as a medium by which the PD and PoE negotiate the amount of power required or available.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

A power sourcing equipment (PSE) includes: processing circuitry, a multiplicity of power over Ethernet (PoE) enabled ports, a PSE module to be executed by the processing circuitry and is operative to: receive requests for power from at least two devices via one PoE enabled port from among the multiplicity of PoE enabled ports, allocate power for the at least two devices according to the requests for power, and provide the power to the at least two devices via the one PoE enabled port.

A power distribution hub (PDH) includes: processing circuitry, a power input port operative to receive power over Ethernet (PoE) from a power sourcing equipment (PSE), a multiplicity of power over PoE enabled ports, a PD module to be executed by the processing circuitry and operative to: negotiate an allocation of PoE from the PSE via the power input port, and a PoE controller operative to provide the PoE to powered devices via the multiplicity of PoE enabled ports.

DETAILED DESCRIPTION OF EXAMPLE EMBODIMENTS

According to the IEEE 802.3at standard, a twisted pair of wires in an Ethernet cable may supply thirty watts of power. Power over Ethernet (PoE) supports using two twisted pairs for power and therefore a port on a power sourcing equipment (PSE) device may provide up to sixty watts of power to a connected powered device (PD). It will be appreciated that an individual PD may not draw the full sixty watts available from a PSE port. For example, lighting fixtures in an Internet of Things (IoT) environment may draw between ten and fifty-five watts, thereby underutilizing the power available from a given port.

Figure 1:
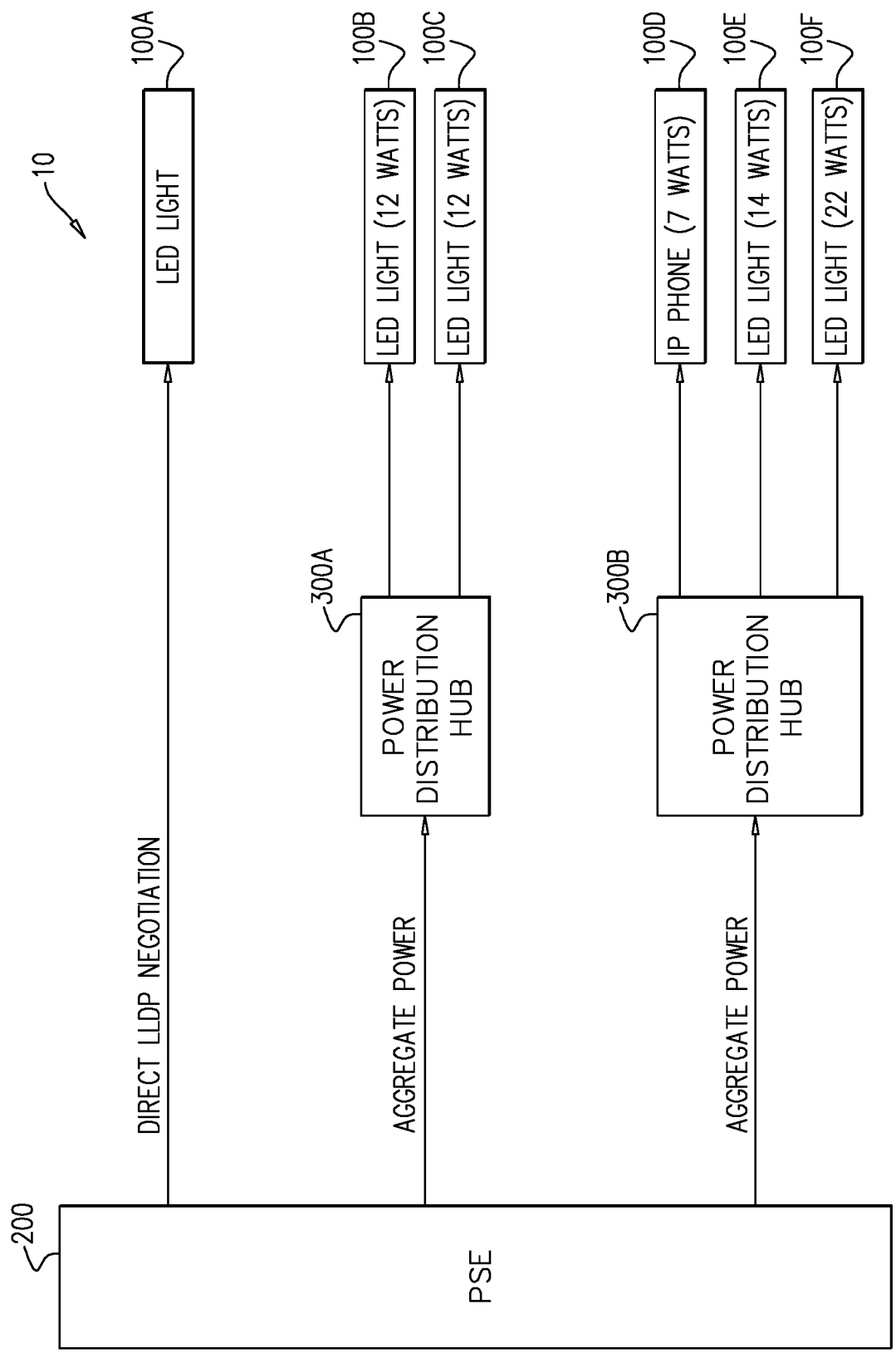
FIG. 1 is a block diagram of an Ethernet power distribution system, constructed and operative in accordance with embodiments described herein.

Reference is now made to FIG. 1 which is a block diagram of an Ethernet power distribution system 10, constructed and operative in accordance with embodiments described herein. System 10 comprises PSE 200, power distribution hubs (PDHs) 300A and 300B (referred to collectively as PDHs 300), and PDs 100A-100F (referred to collectively as PDs 100). In accordance with embodiments described herein, one, or more PDHs 300 may be connected to a port on PSE 200 to enable multiple PDs 100 to draw power from a single port.

PSE 200 may be implemented as a powered Ethernet enabled network connectivity device, operative to use Open Systems Interconnection model (OSI model) layer-2 protocols such as Link Layer Discovery Protocol (LLDP) and/or a proprietary protocol such as, for example, Cisco Discover Protocol (CDP), to allow a connected device, e.g., one of PDs 100, to negotiate for the provision of power through a port on PSE 200. PSE 200 may therefore be, for example, a PoE enabled Ethernet switch, router or hub. It will be appreciated that PoE is typically implemented such that only one PD 100 may draw power from a single PSE port. As depicted in FIG. 1, PD 100A may connect to a port (not shown) on PSE 200, and after direct LLDP-based negotiation, draw power through the PSE port. It will be appreciated that the examples described herein using LLDP-based negotiation may also apply to CDP-based negotiation.

In accordance with embodiments described herein, PDHs 300 may facilitate LLDP-based power negotiation between PDs 100 and the PSE by transparently passing LLDP packets between PDs 100 and PSE 200 without actively participating in the power negotiation. PDs 100 connected to PSE 200 via PDH2 300 may therefore operate in generally the same manner as when they are connected directly to a port on PSE 200. Additional functionality may therefore not be necessary for PDs 100 to participate in system 10.

As depicted in FIG. 1, PDs 100 may connect to PSE 200 via one of PDHs 300. For example, as shown in FIG. 1, PDs 100B and 100C may connect to PSE 200 via PDH 300A; PDs 100D, 100E, and 100F may connect to PSE 200 via PDH 300A. PDHs 300 may be configured to transparently pass LLDP packets between PDs 100 and PSE 200, thereby enabling the PDs 100 to autonomously negotiate for power with PSE 200, without necessitating active participation by the PDs 300 in the negotiation process. PDHs 300 therefore enable one PSE port to provide power to multiple PDs 100.

As disclosed hereinabove, PoE uses either one or two twisted pairs from an Ethernet compatible cable (e.g., a category 5 or category 7 cable) to provide power to PDs 100, where each twisted pair may provide up to thirty watts of power. When PD 100A connects directly to PSE 200, PSE 200 may determine how much power to provide via the connected port based on the power requested in the direct LLDP negotiation conducted with PD 100A. If the power requested by PD 100A is less than or equal to thirty watts, PSE 200 may enable power transmission on one twisted pair in the connected port. If the power requested by PD 100A is greater than thirty watts, PSE 200 may enable power transmission on the second twisted pair as well. If the power requested is greater than sixty watts, PSE 200 may "refuse" the request, i.e., deny the power request by not enabling power transmission.

When providing power via PDHs 300, PSE 200 may be operative to manage the aggregated allocated power in order to determine whether or not to use one or two twisted pairs, and/or to refuse a power request if/when the aggregate amount of power drawn through a given port would exceed the port's output capacity of sixty watts. For example, per the exemplary embodiment of FIG. 1, both PDs 100B and 100C may be LED lights using twelve watts of power each, for a total of twenty-four watts. Additionally, in the exemplary embodiment of FIG. 1, PDH 300A may use three watts of power. Accordingly, the aggregated power drawn through the relevant port on PSE 200 may be twenty-seven watts. PSE 200 may therefore use a single twisted pair to send pair to connected PDH 300A. PDH 300A may then use three watts of power to power itself, and PDs 100A and 100B may each draw twelve watts of power from PDH 300A.

PDs 100D, 100E, and 100F may connect to PSE 200 via PDH 300B. As shown in FIG. 1, PD 100D may be an IP (Internet Protocol) phone using seven watts; PD 100E may be a LED light using fourteen watts; and PD 100F may be a LED light using 22 watts. Accordingly, the aggregated power requests from the relevant port on PSE 200 may be forty-six watts (including three watts for PDH 300B). PSE 200 may therefore enable a second twisted pair to provide power to PDH 300B.

It will be appreciated that PDHs 300 may be passive with regard to the flow of the power to PDs 100; just as PDHs 300 may not participate in the LLDP negotiation between PDs 100 and PSE 200, PDHs 300 may not actively control the amount of power drawn by connected PDs 100. Accordingly, the aggregated amount of power provided to PDH 300A is available to both PDs 100B and 100C; and the aggregated amount of power provided to PDH 300B is available to PDs 100D, 100E and 100F. Proper operation of system 10 may therefore rely on PDs 100 drawing power as requested from PSE 200 during LLDP negotiation. If, as per the exemplary embodiment of FIG. 1, for whatever reason, the aggregated amount of power drawn through PDH 300A exceeds a total of thirty watts (including three watts for the operation of PDH 300A itself) or the aggregated amount of power drawn through PDH 300B exceeds a total of sixty watts, (including three watts for the operation of PDH 300B itself), the associated connected port on PSE 200 may suffer an overcurrent hardware fault and shutdown.

Figure 2:
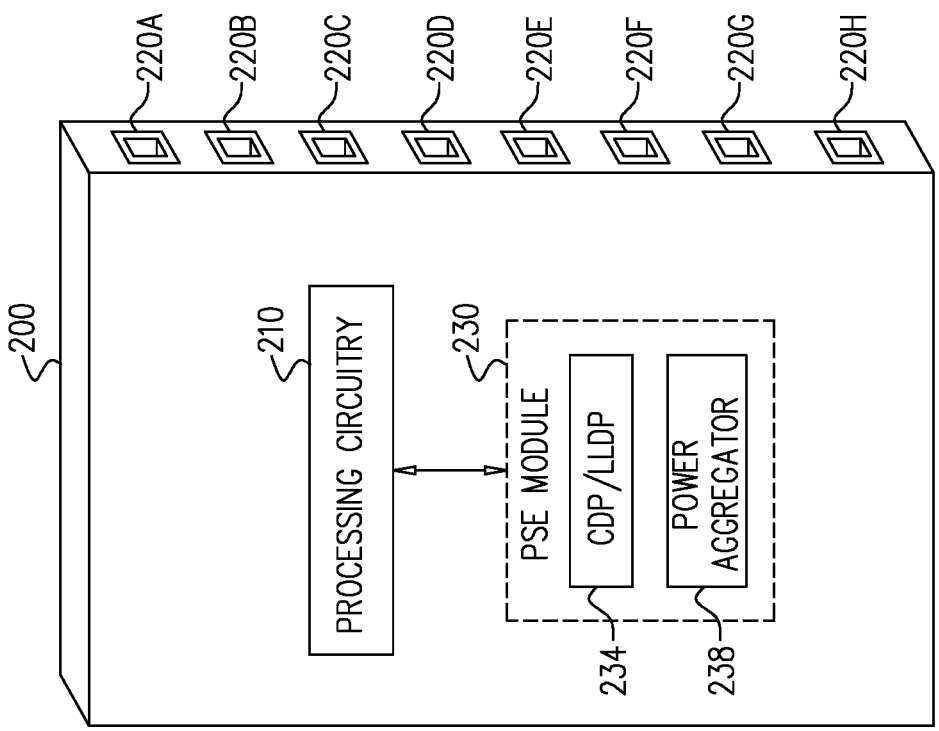
FIG. 2 is a partly pictorial, partly block illustration of an exemplary power sourcing equipment from the system of FIG. 1.

Reference is now made also to FIG. 2 which is a block illustration of an exemplary PSE 200 from the system of FIG. 1. PSE 200 comprises processing circuitry 210, PSE port 220A-220H (referred to collectively as PSE ports 220), and PSE module 230. PSE module 230 may be implemented using any suitable memory for storing firmware or software, such as an optical storage medium, a magnetic storage medium, an electronic storage medium, and/or a combination thereof. It will also be appreciated that in the interests of clarity, while PSE 200 may comprise additional components and/or functionality (e.g., components and functionality for switching Ethernet packets), such additional components and/or functionality are not depicted in FIG. 2 and/or described herein.

Processing circuitry 210 may be operative to execute PSE module 230. It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that PSE 200 may comprise more than one instance of processing circuitry 210. For example, one such instance of processing circuitry 210 may be a special purpose controller operative to execute PSE module 230 to perform some, or all, of the functionality of PSE 200 as discussed with respect to FIG. 1.

PSE ports 220 may be Ethernet ports operative to provide PoE power to connected devices, such as, but not limited to PDs 100 and/or PDHs 300. It will be appreciated that PSE ports 220 may also support transmission and receipt of Ethernet data packets. For example, in an exemplary instance, PSE ports 220A, 220B, 220C, and 220D may be connected to personal computers and may provide standard Ethernet switching functionality for data transmitted by and/or received by the personal computers; PSE ports 220E and 220F may be directly connected to PDs 100 and may use PoE to provide power to the connected PDs 100; and PSE ports 220G and 220H may be connected to PDHs 300 and provide power directly to the PDHs 300 and indirectly to PDs 100 connected to the PDHs 300. It will be appreciated that the embodiments described herein may not be limited to any specific instance of the usage of PSE ports 220.

PSE module 230 may comprise CDP/LLDP 234 and power aggregator 238. CDP/LLDP 234 may be an application implemented in hardware, firmware, or software that may be executed by processing circuitry 210 to at least facilitate using layer-2 protocols such as CDP and/or LLDP to enable PDs 100 to negotiate for power from PSE 200. Power aggregator 238 may be an application implemented in hardware, firmware, or software that may be executed by processing circuitry 210 to track the use of power provided through each of ports 220 to enable PSE module 230 to intelligently enable the use of the second twisted pair in a given port 200 and to prevent over-allocation of power which would otherwise cause a hardware fault when excess power is drawn through the given port 220.

Figure 3:
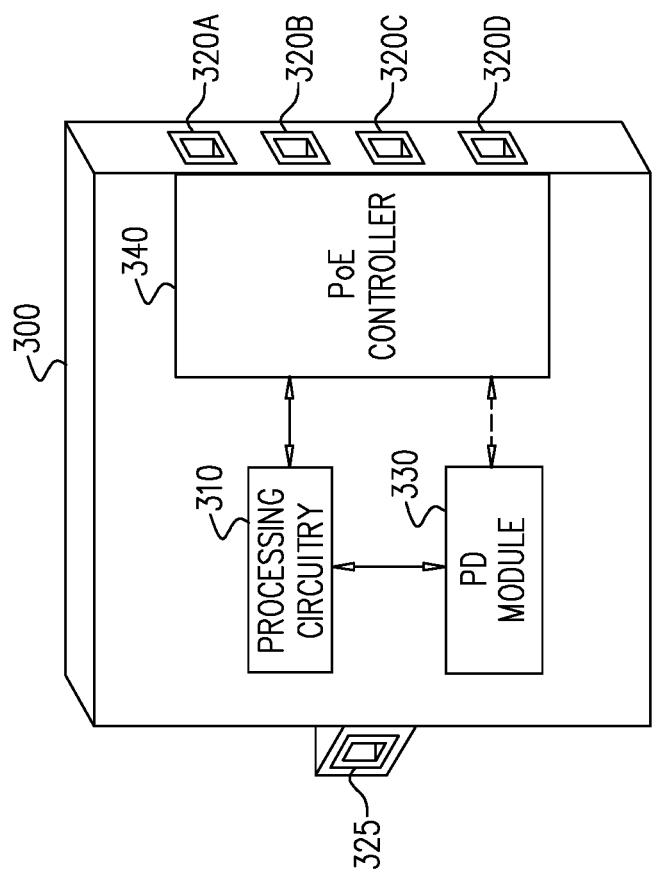
FIG. 3 is a partly pictorial, partly block illustration of an exemplary power distribution hub from the system of FIG. 1.

Reference is now made also to FIG. 3 which is a partly pictorial, partly block illustration of an exemplary power distribution hub (PDH) 300 from the system of FIG. 1, configured and operative in accordance with embodiments described herein. PDH 300 comprises processing circuitry 310, power distribution ports 320A, 320B, 320C, and 320D (referred to collectively as power distribution ports 320), power input port 325, PD module 330 and PoE controller 340.

PD module 330 may be an application implemented in hardware, firmware, and/or software that may be executed by processing circuitry 310 to enable PDH 300 to function as a typical PD 100 drawing power from PSE 200, for example, by using known layer-2 protocols such as CDP and/or LLDP to enable PDH 300 to negotiate for power to be received from PSE 200 via power input port 325. PoE controller 340 may be an application implemented in hardware, firmware, and/or software that may be executed by processing circuitry 310 to control the provision of power to PDs 100 connecting to power distribution ports 320.

Processing circuitry 310 may be operative to execute PD module 330 and/or PoE controller 340. It will be appreciated that processing circuitry 310 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that PDH 300 may comprise more than one instance of processing circuitry 310. For example, one such instance of processing circuitry 310 may be a special purpose processor operative to execute PD module 330 and/or PoE controller 340 to facilitate some or all of the functionality for distributing PoE from a single port 220 (FIG. 2) to multiple PDs 100 as discussed with respect to FIG. 1.

Figure 4:
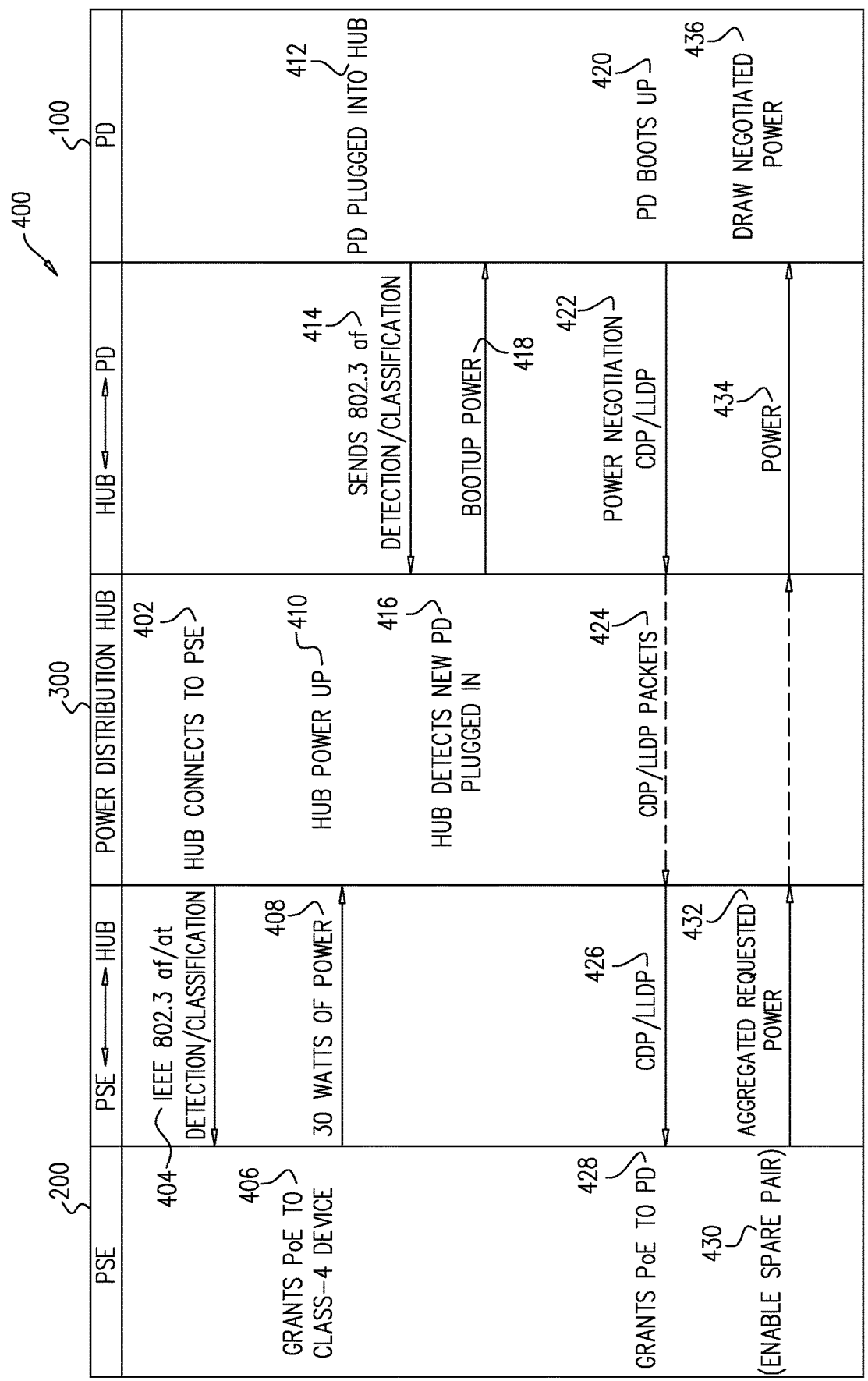
FIG. 4 is an illustration of a process flow for a Power over Ethernet process to be performed by the system of FIG. 1.

Reference is now made also to FIG. 4 which is an illustration of an exemplary process flow 400 to be performed by the system of FIG. 1. PDH 300 may connect (step 402) to PSE 200. For example, an Ethernet compatible cable may be used to connect power input port 325 (FIG. 3) to one of ports 220 (FIG. 2) on PSE 200. For example, in such manner power input port 325 may be connected to port 220A on PSE 200. PD module 330 (FIG. 3) may then send (step 404) IEEE 802.3 af/at detection/classification signals to PSE 200. In accordance with embodiments described herein, PD module 330 may advertise itself as a class 4 device in order to receive a full allocation of thirty watts from PSE 200.

Upon receiving the signals from PDH 300 via port 220A, PSE module 230 may grant (step 406) PoE power as a class 4 device to PDH 300, thereby enabling PDH 300 to draw up to thirty watts of power (step 408) from port 220A. PDH 300 may then power up (step 410) using the power drawn from PSE 200.

PD 100 may be plugged (step 412) into PDH 300. For example, an Ethernet compatible cable may be used to connect PD 100 to one of power distribution ports 320 (FIG. 3) on PDH 300. PD 100 may then send (step 414) IEEE 802.3 af detection/classification signals to PSE 200 via PDH 300. PoE controller 340 (FIG. 3) may detect (step 416) PD 100 via the signals. In response, PoE controller 340 may provide (step 418) boot-up power, i.e. enough power to enable PD 100 to at least negotiate a full allocation of power from PSE 200.

PD 100 may use the boot-up power to begin booting up (step 420) and begin to negotiate a full power allocation by sending layer-2 protocols such as CDP and/or LLDP to PDH 300 (step 422). PDH 300 may allow the CDP/LLDP packets to pass "as is" to PSE 200 (424). For example, PoE, controller 340 may allow the packets to pass through to PD module 330 (FIG. 3) which may then pass them as is to PSE 200 (step 426).

PoE module 230 may grant (step 428) a PoE allocation to PD 100 as per the CDP/LLDP negotiation. If necessary, i.e., if the aggregated power drawn over port 220A exceeds thirty watts, PSE module 230 may enable (step 430) the second twisted pair via port 220A. The aggregated power (including an allotment for the powering of PDH 300) may be made available (step 432) by PSE module 230.

As discussed hereinabove, the power for PDs 100 may pass through PDH 300 and is made available as power (step 434) that may be drawn (step 436) by PD 100. It will be appreciated that PDH 300 may serve as a passive conduit for power drawn by PDs 100; PoE controller 340 may not actively control the amount of power drawn by each PD 100.

Figure 5:
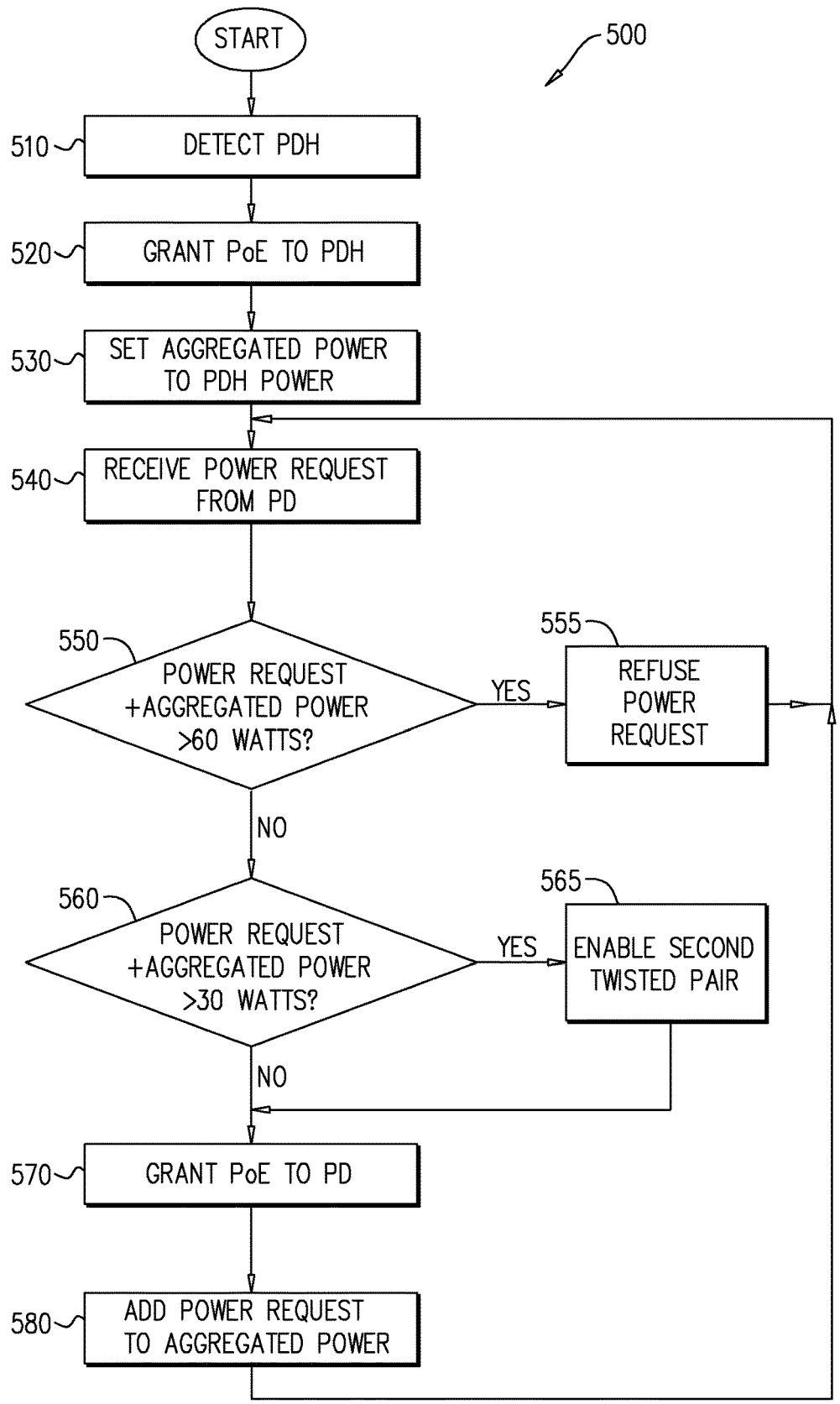
FIG. 5 is a flowchart of an exemplary power allocation process to be performed by the power sourcing equipment of FIG. 2.

FIG. 5, to which reference is now also made, is a flowchart of an exemplary power allocation process to be performed by PSE 200 (FIG. 2). PSE module 230 may detect (step 510) PDH 300 (FIG. 3) when it connects to one of ports 220, and then grant (step 520) PoE to PDH 300 using known methods for detecting and granting PoE to powered devices.

PSE module 230 may grant PoE to PDH 300 as a class 4 device, thereby making thirty watts available to PDH 300. PSE may set (step 530) a variable for aggregated power according to the power used by PDH 300. It will be appreciated that the aggregated power variable may not be set to the full allocated amount of thirty watts, but rather the actual amount drawn by PDH 300 for its operation, independent of the amount to be autonomously drawn by PDs 100. In accordance with an exemplary embodiment described herein, PDH 300 may use three watts for its own operation; the aggregated power variable may therefore be set to three watts in step 530.

PSE module 230 may receive (step 540) a power request from one of PDs 100 connected to PDH 300 in the form of CDP/LLDP packets which may be processed by CDP/LLDP 234. PSE module 230 may invoke power aggregator 238 to determine whether PSE 200 may supply the requested power. If the power request added to the aggregated power (per the variable for aggregated power) exceeds a predetermined power output for a single port 220, e.g., sixty watts for two twisted pairs (step 550), PSE module 230 may refuse (step 555) the power request. The refusal may be communicated by CDP/LLDP 234 and processing control may return to step 540 to await another incoming request.

Otherwise, if the power request added to the aggregated power (per the variable for aggregated power) exceeds a predetermined power output for a single twisted pair, e.g., thirty watts (step 560), PSE module 230 may enable (step 565) a second twisted pair for PoE on the relevant port 220. PSE module 230 may grant (step 570) PoE to the requesting PD 100, and the amount of power requested may be added to the aggregated power variable.

It will be appreciated that PSE module 230 may use methods known in the art (e.g., LLDP-based neighbor expiry) to detect if and when a given connected PD 100 stops drawing power through PDH 300, e.g., disconnects from PDH 300. The amount of power requested and associated with the now disconnected PD 100 may then be subtracted from the variable for aggregated power. It will also be appreciated that power aggregator 238 may be operative to add additional amounts of power to the variable for aggregated power in order to compensate for cable loss along the connections to PDH 300 and/or from PDH 300 to the PDs 100.

In summary, the embodiments described herein may support the connection of multiple PDs via a PDH to a single PSE port by providing power to the PDH, where the provided power corresponds to the aggregate power requirements of the connected PDs and the PDH, and where the provided power does not exceed the total power output possible on the PSE port.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A power sourcing equipment (PSE) comprising:
    processing circuitry;
    a multiplicity of Power over Ethernet (PoE) enabled ports;
    a PSE module to be executed by said processing circuitry and operative to:
        receive requests for power from at least two devices via one PoE enabled port from among said multiplicity of PoE enabled ports, wherein at least one of said at least two powered devices is a power distribution hub (PDH) and at least a second of said at least two powered devices is a powered device (PD) connected to said PoE enabled port via said PDH,
        allocate aggregated power for said at least two devices according to said requests for power, wherein said aggregated power is determined in accordance with at least sufficient power to operate said PDH and said requests for power associated with said at least a second of said at least two powered devices,
        determining whether said aggregated power is greater than a twisted pair output capacity for one twisted pair of Ethernet wiring; and
        upon determining that said aggregated power is greater than a twisted pair output capacity for one twisted pair of Ethernet wiring, providing said aggregated power via two twisted pairs of Ethernet wiring in said PoE enabled port; and
        provide said aggregated power to said at least two devices via said one PoE enabled port.

2. The PSE according to claim 1 wherein said PSE module is further operative to receive said requests for power using Open Systems Interconnection model (OSI model) layer-2 protocols.

3. The PSE according to claim 1 wherein said PSE module is further operative to:
    maintain an aggregated power variable corresponding to an amount of power used by said PDH for operation and at least power allocated in response to said requests for power associated with said at least a second of said at least two devices;
    compute a new aggregated power total by adding a value corresponding to a most recent request for power to said aggregated power variable;
    determine whether said new aggregated power total exceeds a power output capacity for said one PoE enabled port, wherein said most recent request for power is from among said requests for power associated with said at least a second of said at least two devices; and
    upon determining that said new aggregated power total exceeds said power output capacity, denying said most recent request for power.

4. The PSE according to claim 1 wherein said twisted pair output capacity is thirty watts.

5. The PSE according to claim 1, wherein said PSE module is further operative to:
    detect connection of said PD to said PDH; and
    providing boot-up power to said PD from said PDH.

6. The PSE according to claim 1, wherein said PSE module is further operative to:
    pass said request for power from said PD to said PSE.

7. The PSE according to claim 1, wherein said PSE module is further operative to:
    enable said at least a second of said at least two powered devices to draw power according to said requests for power associated with said at least a second of said at least two powered devices.

8. A method for supplying Power over Ethernet (PoE) comprising:
    on a power sourcing equipment (PSE), receiving, via a PoE enabled port, requests for power from at least two powered devices, wherein at least one of said at least two powered devices is a power distribution hub (PDH) and at least a second of said at least two powered devices is a powered device (PD) connected to said PoE enabled port via said PDH;
    allocating aggregated power for said requests for power via said PoE enabled port, wherein said aggregated power is determined in accordance with at least sufficient power to operate said PDH and said requests for power associated with said at least a second of said at least two powered devices;
    determining whether said aggregated power is greater than a twisted pair output capacity for one twisted pair of Ethernet wiring;
    upon determining that said aggregated power is greater than a twisted pair output capacity for one twisted pair of Ethernet wiring, providing said aggregated power via two twisted pairs of Ethernet wiring in said PoE enabled port; and
    providing said aggregated power to said PDH via said PoE enabled port.

9. The method according to claim 8 wherein said allocating comprises:
    limiting said aggregated power to a power output capacity for two twisted pairs of Ethernet wiring.

10. The method according to claim 8 wherein said requests for power are received via OSI model layer-2 protocols.

11. The method according to claim 8 and further comprising:
    on said PDH, detecting connection of said PD to said PDH; and
    providing boot-up power to said PD from said PDH.

12. The method according to claim 8 and further comprising:
    on said PDH, passing said request for power from said PD to said PSE.

13. The method according to claim 8 and further comprising:
    on said PDH, enabling said at least a second of said at least two powered devices to draw power according to said requests for power associated with said at least a second of said at least two powered devices.

* * * * *

UNITED STATES PATENT AND TRADEMARK OFFICE
CERTIFICATE OF CORRECTION

PATENT NO. : 10,887,116 B2
APPLICATION NO. : 15/836972
DATED : January 5, 2021
INVENTOR(S) : Padmanabhan Ramanujam et al.

Page 1 of 1

It is certified that error appears in the above-identified patent and that said Letters Patent is hereby corrected as shown below:

In the Specification

Column 6, Line 63, please amend as shown:
components as a signal interpretable by an appropriate com- Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*